(12) United States Patent
Shahar et al.

(10) Patent No.: US 10,757,183 B2
(45) Date of Patent: Aug. 25, 2020

(54) DELAYED RESPONDER-NOT-READY NEGATIVE ACKNOWLEDGEMENT

(71) Applicant: Mellanox Technologies, Ltd., Yokneam (IL)

(72) Inventors: Ariel Shahar, Jerusalem (IL); Shahaf Shuler, Karkom (IL); Lion Levi, Yavne (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 92 days.

(21) Appl. No.: 15/924,293

(22) Filed: Mar. 19, 2018

(65) Prior Publication Data

US 2019/0289065 A1    Sep. 19, 2019

(51) Int. Cl.
*H04L 29/08* (2006.01)
*H04L 1/16* (2006.01)
*H04L 12/931* (2013.01)

(52) U.S. Cl.
CPC .......... *H04L 67/104* (2013.01); *H04L 1/1685* (2013.01); *H04L 49/358* (2013.01)

(58) Field of Classification Search
None
See application file for complete search history.

(56) References Cited

U.S. PATENT DOCUMENTS

| 7,032,153 B1 * | 4/2006 | Zhang | H04L 1/0018 714/749 |
| 2007/0206610 A1 * | 9/2007 | Teodosiu | H04L 67/06 370/400 |

OTHER PUBLICATIONS

InfiniBand TM Architecture Specification, vol. 1, Release 1.3, 1842 pages, Mar. 3, 2015.

* cited by examiner

*Primary Examiner* — Cai Y Chen
(74) *Attorney, Agent, or Firm* — Kligler & Associates Patent Attorneys Ltd

(57) ABSTRACT

A method for communication includes receiving in a computer system a request from a peer computer system. Upon finding that the computer system is currently not ready to process the request, a Negative Acknowledgement (NAK) message is sent from the computer system to the peer computer system, at a sending time that is derived from a time at which the computer system is ready to process the request.

14 Claims, 3 Drawing Sheets

DELAYED RESPONDER-NOT-READY NEGATIVE ACKNOWLEDGEMENT

FIELD OF THE INVENTION

The present invention relates generally to reliable communication in a computer network, and, particularly, to methods and systems facilitating efficient reliable communication in acknowledge-based computer communication protocols, such as InfiniBand.

BACKGROUND OF THE INVENTION

One of the more common high-performance computer communication network standards is InfiniBand (abbreviated IB). Infiniband features high throughput and low latency, and is used for data interconnect both among and within computers, as well as between servers and storage systems. The Infiniband protocol is specified by the Infiniband Trade Association, for example in "Infiniband Architecture Specification Volume 1," Release 1.3, March 2015, which is incorporated herein by reference. Section 9.7 of this specification defines the Infiniband Reliable Service, including an ACK/NAK protocol that supports a Receiver Not Ready NAK (RNR NAK) response.

SUMMARY OF THE INVENTION

An embodiment of the present invention that is described herein provides a method for communication, including receiving in a computer system a request from a peer computer system. Upon finding that the commuter system is currently not ready to process the request, a Negative Acknowledgement (NAK) message is sent from the computer system to the peer computer system, at a sending time that is derived from a time at which the computer system is ready to process the request.

In an embodiment, sending the NAK message includes specifying, in the NAK message, that the peer computer system is to send a retried request after a minimally-supported time delay. In another embodiment, sending the NAK message includes setting the sending time of the NAK message to be equal to the time at which the computer system is ready to process the request. In yet another embodiment, sending the NAK message includes setting the sending time of the NAK message to an earlier of (i) the computer system is ready to process the request, and (ii) a predetermined time period, configured to guarantee that the peen computer system will not enter a timeout procedure, has elapsed since the computer system received the request.

In some embodiments, sending the NAK message includes setting the sending time of the NAK message to be to a time earlier than the time at which the computer system is ready to process the request. In a disclosed embodiment, sending the NAK message includes setting the sending time of the NAK message to precede the time at which the computer system is ready to process the request by a time interval, which is derived from a round-trip delay between the computer system and the peer computer system. In an example embodiment, sending the NAK message includes setting the sending time of the NAK message to the time at which an early indication, preceding the time in which the computer system is ready to process the request, is generated in the computer system.

There is additionally provided, in accordance with an embodiment of the present invention, a method for communication, including sending from a computer system a request to a peer computer system. A Negative Acknowledgement (NAK) message, which indicates that the peer computer system is not ready to process the request, is received from the peer computer system. The NAK message specifies a time delay after which the computer system is to send a retried request. The retried request is sent from the computer system to the peer computer system after a time delay shorter than the time delay specified in the NAK message.

There is also provided, in accordance with an embodiment of the present invention, a computer system including an interface and a processor. The interface is configured for communicating oven a communication network. The processor is configured to receive, over the communication network via the interface, a request from a peer computer system, and upon finding that the computer system is currently not ready to process the request, to send to the peer computer system a Negative Acknowledgement (NAK) message at a sending time that is derived from a time at which the computer system is ready to process the request.

There is further provided, in accordance with an embodiment of the present invention, a computer system including an interface and a processor. The interface is configured for communicating over a communication network. The processor is configured to send, over the communication network via the interface, a request to a peer computer system, to receive from the peer computer system, over the communication network via the interface, a Negative Acknowledgement (NAK) response message, which indicates that the peer computer system is not ready to process the request. The NAK message specifies a time delay after which the computer system is to send a retried request, and to send a retried request to the peer computer system after a time delay shorter than the time delay specified in the NAK message.

The present invention will be more fully understood from the following detailed description of the embodiments thereof, taken together with the drawings in which:

DETAILED DESCRIPTION OF EMBODIMENTS

Overview

Figure 1:
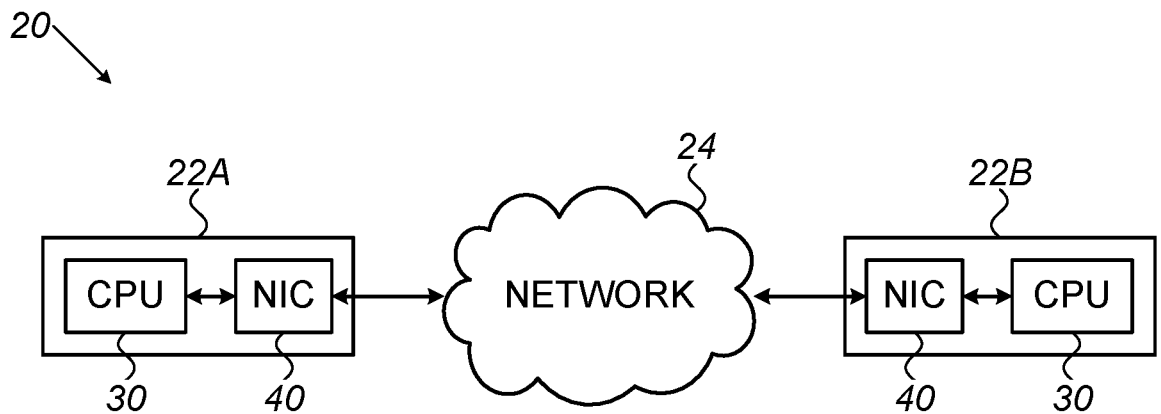
FIG. 1 is a block diagram that schematically illustrates a computer network, in accordance with an embodiment of the present invention.

To facilitate high reliability communication, the InfiniBand specification defines that data transfers will follow a request—acknowledge protocol whereas a Requestor sends a Request message, and a Responder sends an Acknowledgement message (ACK) if it is ready, and a Responder-Not-Ready Negative-Acknowledgement message (RNR-NAK) if it is not ready. If the requestor gets an ACK response, it will proceed; If the requestor gets RNR-NAK as a response to a request, it will retry to send the request after a certain time delay; If no response is received within a preset period of time, the requestor may enter a timeout procedure and possibly abandon the request.

To minimize requests traffic on the bus and/or across the network, the RNR-NAK message includes a certain field, which is used to indicate to the Requestor the minimum time-period it should wait before retrying the request. The foregoing mechanism is described in section 9.7 of the Infiniband Architecture Specifications, cited above. The field used to indicate the minimum time period that the Requestor should wait before retrying the request is denoted TTTTT in the Infiniband specifications.

In practice, very often the Responder cannot accurately tell when it is going to be ready, and typically sends an estimated TTTTT instead. Inaccurate specification of the TTTTT field by the Responder may result in wasted time and/or unnecessary signaling overhead. For example, if the estimated TTTTT is too short, the Requestor will send the retried message when the Responder is not yet ready and get another RNR-NAK. If the estimated TTTTT is too long, the request will not be fulfilled although the response will be ready, and the latency time will increase.

Embodiments of the present invention that are described herein provide improved request-response techniques in computer networks. In some embodiments, if a Responder is not ready, it will not send a response to the Requestor until it is ready. Only when ready, the Responder will send an RNR-NAK. In an embodiment, the Responder sets the TTTTT value in the RNR-NAK to the minimum allowed value. Consequently, the Requestor will retry the request when the Responder is ready—not sooner, and with a delay equal to the minimum allowed TTTTT value. In some embodiments, the delay will be shorter than the minimum value of TTTTT.

In other embodiments of the present invention the responder will send RNR-NAK message when it is ready, but no later than a certain time delay after receiving the request; the time delay will be set such that the Requestor will not enter a time-out procedure, which may imply abandoning the request.

More generally, in some embodiments the Responder may send the RNR-NAK message at a sending time that is derived from the time at which the Responder is (or is expected to be) ready to process the request. Several possible techniques of setting the sending time of the RNR-NAK message by the Responder are described herein. All of these variants are regarded as deriving the sending time from the time at which the Responder is ready to process the request.

When a computer system is implemented in accordance with embodiments of the present invention, throughput over the network may increase as the number of request retries may be be reduced, and the average latency time may decrease as TTTTT will always be set to the minimum allowed value. The increase in throughput may result in improved communication and overall system performance.

System Description

FIG. 1 is a block diagram that schematically illustrates a computer network 20 in accordance with an embodiment of the present invention. In the present example network 20 comprises two computers systems 22A and 22B, communicating over a communication network 24. In the foregoing, any of computer systems 22A and 22B will be referred to as Computer System 22, for brevity.

Each computer system 22 may comprise, for example, a server, a personal computer, a storage controller, a storage device, or any other suitable computing platform. Network 24 may comprise, for example, a Local-Area Network (LAN), a Wide-Area Network (WAN) such as the Internet, or any other suitable network type.

Each computer system 22 typically comprises a respective processor, in the present example a Central Processing Unit (CPU) 30, which is programmed in software. Each Computer system 22 further comprises a Network Interface Controller (NIC) 40, referred to as Host Channel Adapter (HCA) in Infiniband terminology.

According to embodiments of the present invention, each computer system 22 can be either a Requestor or a Responder as will be explained below; further, each computer system 22, connected to network 24, can be at times a Requestor and at other times a Responder. In other embodiments of the present invention one or more or computer systems 22 may have a permanent configuration—either a Requestor or Responder.

A Request may comprise, for example, allocation of storage area in the Responder memory, to be used to store data from the Requestor. A Response may be, for the current example, confirmation that the request has been received. Alternatively, however, any other suitable kind of Requests and Responses can be used.

In the foregoing, a Requestor is a computer system 22 temporarily or permanently configured to send Requests to a peer computer system 22, and a Responder is a computer system 22, temporarily or permanently configured to send a Response to such a Request.

Figure 2:
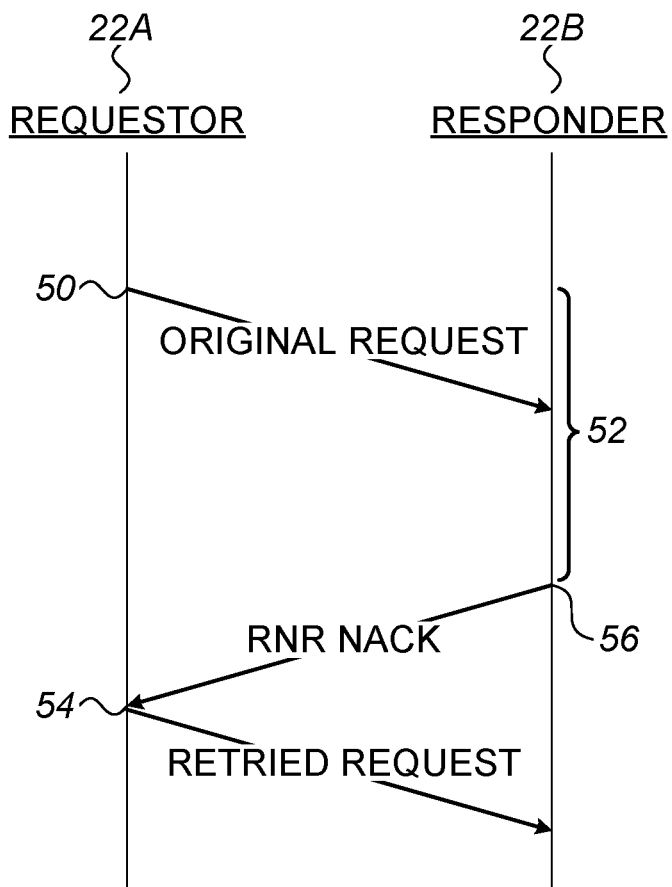
FIG. 2 is a schematic illustration of a request-response flow with Delayed-RNR-NAK, in accordance with an embodiment of the present invention.

FIG. 2 is a schematic illustration of a request-response flow with Delayed-RNR-NAK, in accordance with an embodiment of the present invention. The figure shows the exchange of messages of a Request, and a Response to such Request when the Responder is not ready.

In the example of FIG. 2, Requestor 22A sends a Request 50 to Responder 22B. During a time-period 52, Responder 22B is not ready and cannot process request 50. Responder 22B may not be ready, for example, if it has no memory space and/or no CPU resources to process the request, or for any other reason.

According to embodiments of the present invention, if Responder 22B is not currently ready to process Request 50, the Responder does not send an RNR-NAK immediately upon receiving the request. Instead, Responder 22B sends a RNR-NAK message 56 at a sending time in which it is ready to process the request, i.e. at the bottom end of period 52. NAK message 56 is also referred to herein as Delayed-RNR-NAK, and the two terms are used interchangeably.

In some embodiments, if Responder 22B is not currently ready to process Request 50, the Responder sends a RNR-NAK message 56 at a sending time in which it is ready to process the request, but no later than a predefined time interval since it has received request 50, i.e. when period 52 reaches a predefined value or when it ends, the sooner; the predetermined time interval is set to guarantee that the Requestor will not enter a time-out procedure and might abandon the request, i.e., drop the connection.

In an embodiment, in Delayed-RNR-NAK message 56, Responder 22B sets TTTTTT to the minimum allowed value. When Requestor 22A sends a retried request 54 in response to RNR-NAK message 56, Responder 22B is ready, and sends an ACK message (not shown) to requestor 22A.

In other embodiments, if Responder 22B is not currently ready to process Request 50, it will send Delayed-RNR-NAK message 56 sending time that occurs before the end of period 52 (but is nevertheless derived from the time the Responder is expected to be ready). For example, Responder 22B may send delayed RNR-NAK 56 at a time such that the round-trip delay (from the sending time of the delayed RNR message 56 to the time a Retried Request 54 is received from the Requestor) will guarantee that Responder 22B will be ready when the Retried Request message is received by Responder 22B from Requestor 22A.

In other embodiments, Responder 22B may have, prior to the end of period 52, an indication of when it will be ready to process the request. In some embodiments, in this case, Responder 22B may send a delayed-RNR-NAK at a sending time set to the time of the indication (but nevertheless derived from the time the Responder is expected to be ready)

In embodiments requester 22A, upon receiving from Responder 22B a Delayed-RNR-NAK, may send a retried request after a delay time shorter than the delay indicated in the Delayed-RNR-NAK message.

Figure 3:
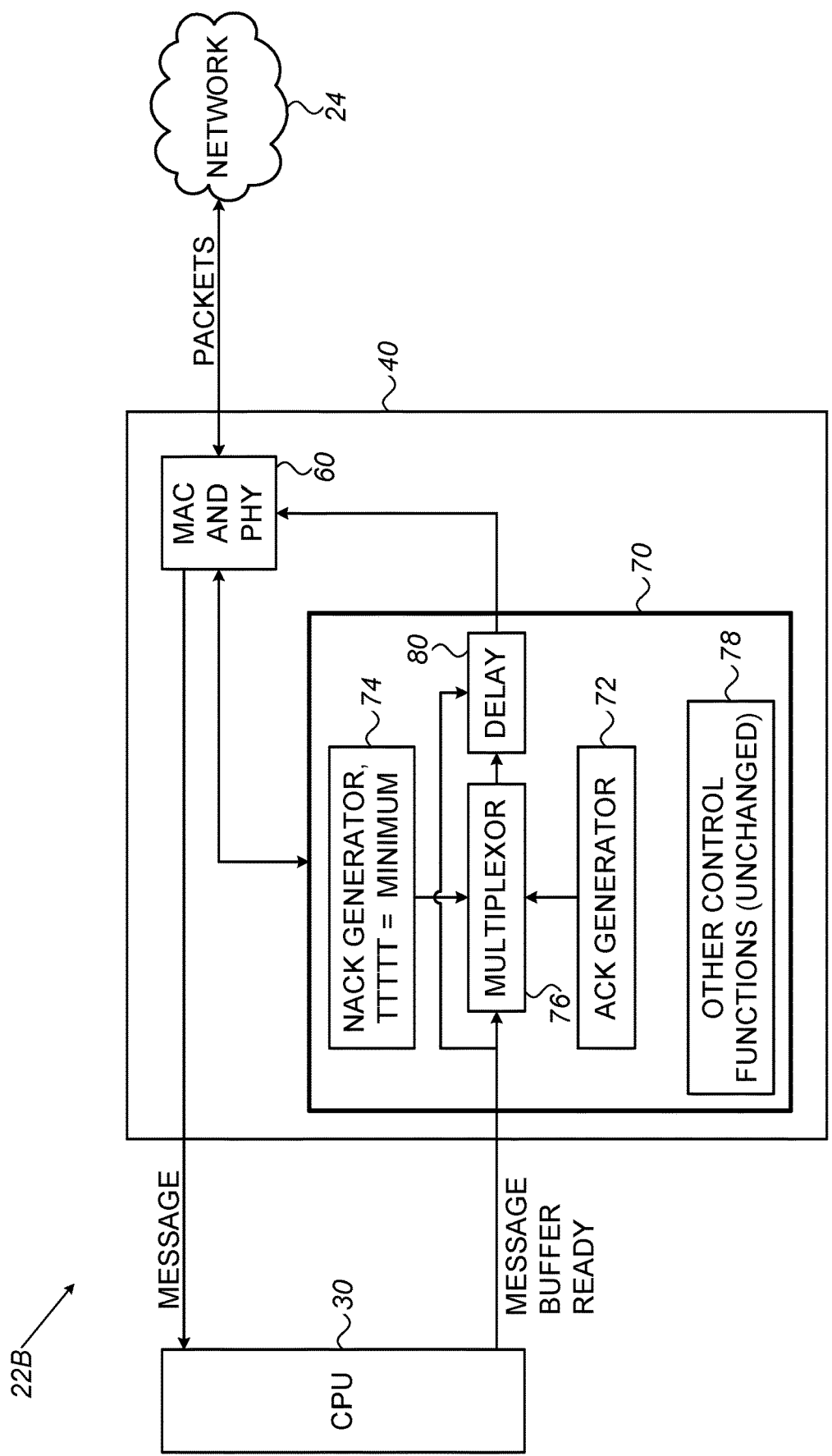
FIG. 3 is a block diagram that schematically illustrates the structure of the Responder, in accordance with an embodiment of the present invention.

FIG. 3 is a block diagram that schematically illustrates the structure of Responder 22B, in accordance with an embodiment of the present invention. As shown in FIG. 1, for example, Responder 22B is a computer system, comprising a CPU 30 and a NIC 40, and connected to Network 24. NIC 40 typically comprises a MAC and PHY unit 60, and a controller 70. MAC and PHY unit 60 serves as an interface for connecting NIC 40 to network 24. Controller 70 is also referred to as a processor.

In some embodiments of the present invention, Controller 70 comprises a) an ACK generator 72 configured to generate ACK Response messages; b) a NAK generator 74 configured to generate NAK Response messages with TTTTT set to the minimum allowed value; c) a multiplexor unit 76 configured to copy one of its two input messages onto its output according to its control input; d) a Delay Unit 80, configured to delay the input messages to a sending time at which a ready input is set; and e) other control functions 78, which are not relevant to the present invention.

When a Request message is received from Network 24 through MAC and PHY unit 60, Multiplexor 76 will select a message, either the output of NAK generator 74 or the output of ACK generator 72, and forward it to delay-unit 80.

For example, if the CPU's message buffer is ready multiplexor 76 will select the output of the ACK generator; otherwise, multiplexor 76 will select the output of NAK generator 74. (In this example the Responder is ready to process a request if the CPU message buffer has available space, and not ready otherwise. Other suitable criteria for deciding whether the responder is ready can also be used.)

If the message buffer of CPU 30 is not ready, a NAK message from Multiplexor 76 will be stored in Delay Unit 80. When the message buffer becomes ready, Delay Unit 80 will forward the NAK message to MAC and PHY unit 60. If the message buffer is ready, the Delay-Unit will forward an ACK message to MAC and PHY unit 60 with no delay.

Figure 4:
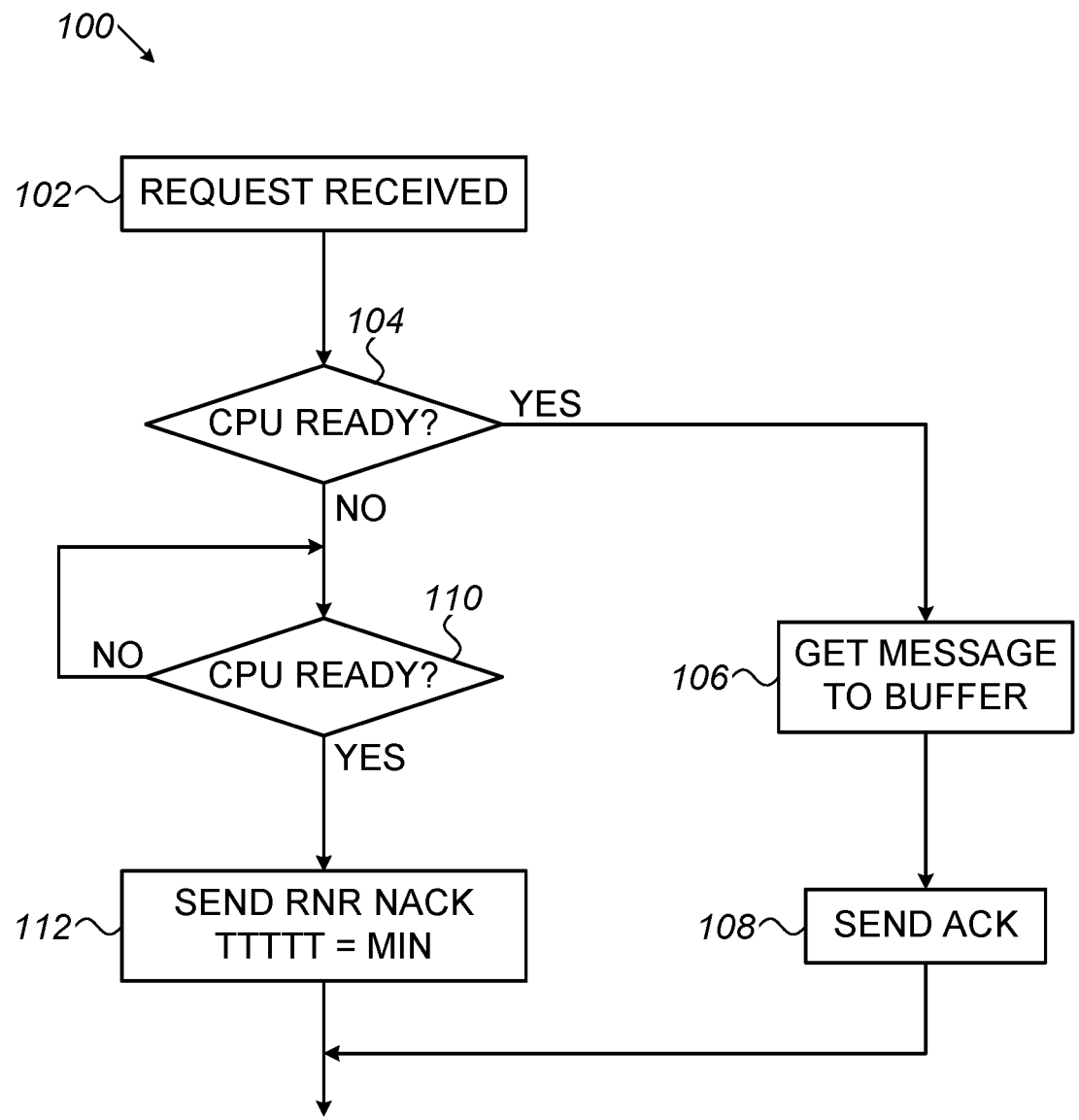
FIG. 4 is a flow chart that schematically illustrates a method for facilitating Delayed-RNR-NAK, in accordance with an embodiment of the present invention.

FIG. 4 is a flow chart 100 that schematically illustrates a method for facilitating Delayed-RNR-NAK, in accordance with an embodiment of the present invention. The flow-chart is typically executed by Controller 70 of Responder 22B (FIG. 3). The method begins with the Responder receiving a Request, at a request reception step 102. At a CPU ready checking step 104, Controller 70 checks whether the message buffer of CPU 30 is ready or not. If ready, controller 70 will enter a buffering step 106, whereupon it will send the request message to the buffer. At an ACK sending step 108 Controller 70 sends an ACK message through Network 24, and then exits the current flow-chart.

In case that, at a CPU ready checking step 104, Controller 70 finds out that the message buffer of CPU 30 is not ready, Controller 70 will enter another CPU Ready Checking step 110. While in step 110, Controller 70 waits for the message buffer of CPU 30 to become ready; if the message buffer is not ready, controller 70 will reenter step 110. If the message buffer of CPU 30 is ready, Controller 70 will exit step 110 and enter a NAK sending step 112. In Step 112, controller 70 sends an RNR-NAK message through Network 24 with TTTTT set to the minimum allowed value, and then exits the current flow-chart.

The configurations of computer network 20, computer systems 22A and 22B and NIC 40 shown in FIGS. 1 and 3 are example configurations that are shown purely for the sake of conceptual clarity. Any other suitable configurations can be used in alternative embodiments. For example, FIG. 1 shows only two computer systems. In many real-life implementations, however, computer network 20 would typically comprise a large number of computer systems. As another example, NIC 40 may have any other internal structure, not necessarily the structure shown in FIG. 3.

Although the embodiments described herein refer mainly to Infiniband networks, the disclosed techniques are applicable to other suitable NAK-based and ACK-NAK-based network types and communication protocols. Examples may include Bisync Reliable-Multicast and RDMA over Converged Ethernet (RoCE).

The different elements of each computer system, such as CPU 30 and NIC 40, may be implemented using suitable hardware, such as in an Application-Specific Integrated Circuit (ASIC) or Field-Programmable Gate Array (FPGA), using software, using hardware, or using a combination of hardware and software elements.

In some embodiments, CPU 30 and/or controller 70 of NIC 40 comprise a general-purpose programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for communication, comprising:
   receiving in a computer system a request from a peer computer system;
   in response to receiving the request determining whether the computer system is ready to process the request; and
   upon finding that the computer system is currently not ready to process the request, selecting a delayed sending time derived from a time at which the computer system is ready or is expected to be ready and sending from the computer system to the peer computer system a Negative Acknowledgement (NAK) message at the selected delayed sending time, wherein selecting the delayed sending time comprises setting the sending time of the NAK message to an earlier of (i) the computer system is ready to process the request, and (ii) a predetermined time period, configured to guarantee that the peer computer system will not enter a timeout procedure, has elapsed since the computer system received the request.

2. The method according to claim 1, wherein sending the NAK message comprises specifying, in the NAK message, that the peer computer system is to send a retried request after a minimally-supported time delay.

3. The method according to claim 1, wherein selecting the delayed sending time comprises setting the sending time of the NAK message to be equal to the time at which the computer system is ready to process the request.

4. The method according to claim 1, wherein selecting the delayed sending time comprises setting the sending time of the NAK message to a time earlier than the time at which the computer system is ready to process the request.

5. The method according to claim 1, wherein selecting the delayed sending time comprises setting the sending time of the NAK message to precede the time at which the computer system is ready to process the request by a time interval, which is derived from a round-trip delay between the computer system and the peer computer system.

6. The method according to claim 1, wherein selecting the delayed sending time comprises setting the sending time of the NAK message to the time at which an early indication, preceding the time in which the computer system is ready to process the request, is generated in the computer system.

7. A computer system, comprising:
an interface for communicating over a communication network; and
a processor, which is configured to receive, over the communication network via the interface, a request from a peer computer system, in response to receiving the request to determine whether the computer system is ready to process the request and upon finding that the computer system is currently not ready to process the request, to select a delayed sending time derived from a time at which the computer system is ready or is expected to be ready and to send to the peer computer system a Negative Acknowledgement (NAK) message at the selected delayed sending time,
wherein the processor is configured to set the sending time of the NAK message to an earlier of (i) the computer system is ready to process the request, and (ii) a predetermined period of time, configured to guarantee that the peer computer system will not enter a timeout procedure, has elapsed since the computer system received the request.

8. The computer system according to claim 7, wherein the processor is configured to specify, in the NAK message, that the peer computer system is to send a retried request after a minimally-supported time delay.

9. The computer system according to claim 7, wherein the processor is configured to set the sending time of the NAK message to be equal to the time at which the computer system is ready to process the request.

10. The computer system according to claim 7, wherein the processor is configured to set the sending time of the NAK message to be to a time earlier than the time at which the computer system is ready to process the request.

11. The computer system according to claim 7, wherein the processor is configured to set the sending time of the NAK message to precede the time at which the computer system is ready to process the request by a time interval, which is derived from a round-trip delay between the computer system and the peer computer system.

12. The computer system according to claim 7, wherein the processor is configured to set the sending time of the NAK message to the time at which an early indication, preceding the time in which the computer system is ready to process the request, is generated in the computer system.

13. A computer system, comprising:
an interface for communicating over a communication network; and
a processor, which is configured to send, over the communication network via the interface, a request to a peer computer system, to receive from the peer computer system, over the communication network via the interface, a Negative Acknowledgement (NAK) response message, which indicates that the peer computer system is not ready to process the request, wherein the NAK message specifies a time delay after which the computer system is to send a retried request, and to send a retried request to the peer computer system after a time delay shorter than the time delay specified in the NAK message;
wherein the processor is configured to set the sending time of the NAK message to an earlier of (i) the computer system is ready to process the request, and (ii) a predetermined period of time, configured to guarantee that the peer computer system will not enter a timeout procedure, has elapsed since the computer system received the request.

14. The computer system according to claim 7, wherein the processor is configured in response to the received request to send an acknowledgement message to the peer computer system with no delay, upon finding that the computer system is currently ready.

\* \* \* \* \*